Aug. 4, 1931.  A. N. SPANEL  1,817,534
DEVICE FOR TREATING ARTICLES
Filed July 19, 1928   2 Sheets-Sheet 1
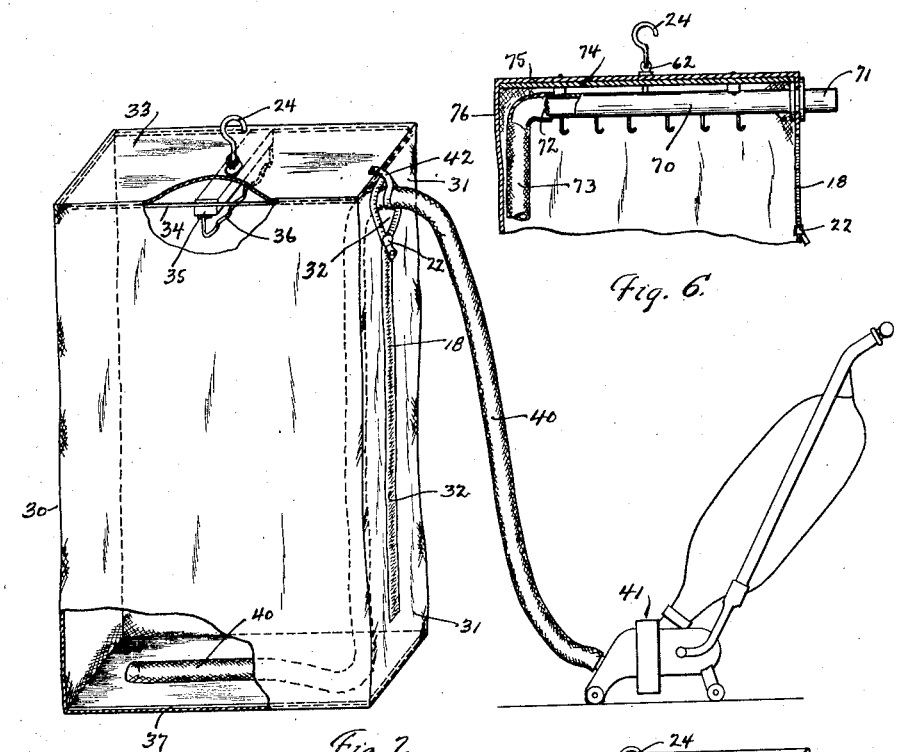
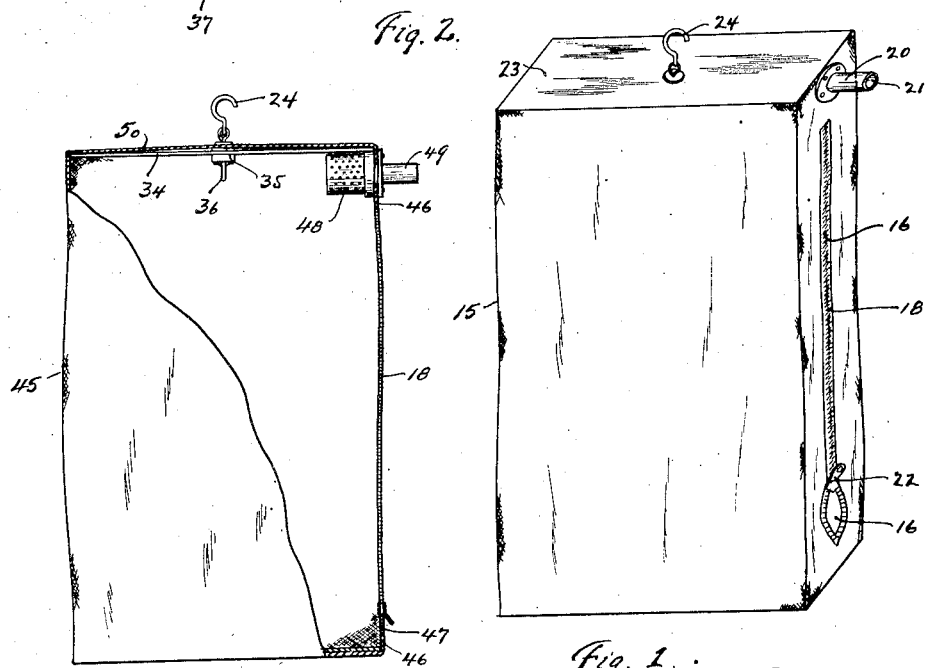
Fig. 1.
Fig. 2.
Fig. 3.
Fig. 6.

Aug. 4, 1931.  A. N. SPANEL  1,817,534
DEVICE FOR TREATING ARTICLES
Filed July 19, 1928  2 Sheets-Sheet 2
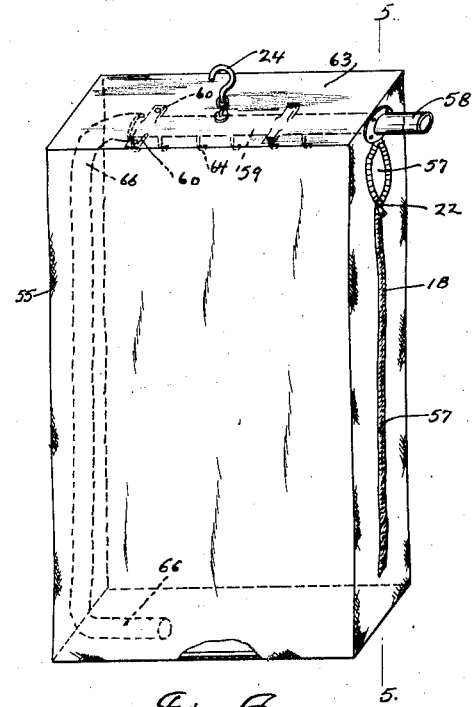
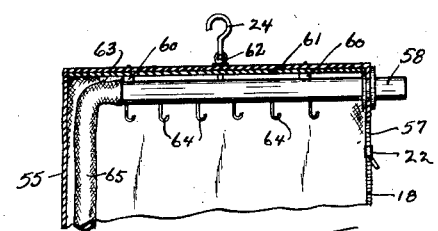
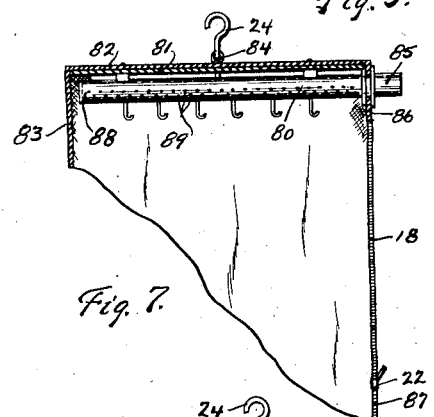
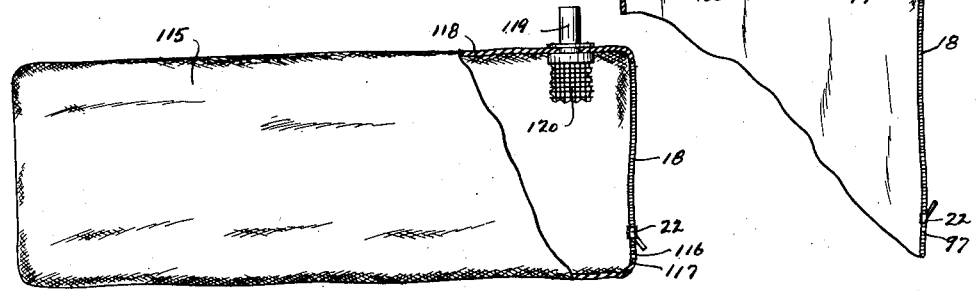

Patented Aug. 4, 1931

1,817,534

UNITED STATES PATENT OFFICE

ABRAHAM N. SPANEL, OF ROCHESTER, NEW YORK

DEVICE FOR TREATING ARTICLES

Application filed July 19, 1928. Serial No. 293,996.

My invention relates in general to devices for aerating, fumigating, disinfecting and moth-proofing fabric articles, such as wearing apparel, mattresses, blankets, woolens, pillows, overstuffed furniture, and the like, to oxygenize the articles and to rid them of insect and germ life.

The principal object of my invention has been to provide a container for the articles being treated which shall have an arrangement of openings carried by or applied to the container whereby articles to be treated may be inserted in the container, and suitable suction or pressure applied to the container for treating the articles, such openings being preferably adjacent to each other.

Another object has been to provide a device which may be used in connection with a suction or pressure device having an insecticide holder arranged near the top of the container.

Another object has been to provide a construction and arrangement of parts which shall cheapen the cost of manufacture and at the same time increase the salability of the device.

The above objects and advantages have been accomplished by the device shown in the accompanying drawings, of which:

Fig. 1 shows a perspective view of one form of my device.

Fig. 2 is a perspective view of a modified form of device, showing its use in connection with a vacuum cleaner.

Fig. 3 is a longitudinal, sectional elevation of a device similar to that shown in Fig. 1, with the addition of an insecticide holder disposed inside the container.

Fig. 4 is a perspective view of another modification of my invention.

Fig. 5 is a fragmentary, sectional elevation of the form of invention shown in Fig. 4.

Fig. 6 is a similar view of a modified structure.

Fig. 7 is a similar view of another modification.

Fig. 8 is a longitudinal, fragmentary, sectional view of the form of device shown in Fig. 3 with a modified form of insecticide holder.

Fig. 9 shows a modified form of container.

Fig. 10 shows still another modification of my invention.

My invention is designed primarily to be used in connection with any pressure or suction producing device, such, for instance, as a household vacuum cleaner and the attachment hose thereof. The device consists in a container 15 which is made preferably of collapsible material, such as any suitable fabric, paper, leather, or the like. It may be made of material which is porous or semi-porous if the device is to be used for aerating and oxygenizing only; but, if it is to be used for fumigating, disinfecting or moth-proofing, it is preferable that the body be of non-porous material, such as rubberized cloth, or the like, since, particularly when moth-proofing, it is desirable to have the container substantially air-tight for retaining the vapors of the insecticide used. The container may take any suitable form and is preferably rectangular as is shown in Fig. 1, and of a length slightly greater than the length of the garments to be treated therein, when such garments are to be suspended in the device. When the device is to be used for treating blankets and other objects which are not to be suspended, then the container may take the form of the devices shown in Figs. 9 and 10.

Referring again to the form of device shown in Fig. 1, the container 15 is provided with a container opening 16, formed in its side wall 17 which extends practically the full length of the container, and through which articles to be treated may be inserted. This opening may be closed by any suitable means. I have, however, found that the well-known hookless fastener 18 is very satisfactory, and have shown this fastener as applied to the various forms of the device throughout the drawings, except in the form of device shown in Fig. 9. An air conduit in the form of an attachment sleeve 20 is secured to the side wall 17 of the body, preferably adjacent the upper end of the container opening 16, thus providing an opening 21 through which air may pass when the sleeve is connected with any source of suction or pressure. In this form of my invention, the hookless fastener 18 is so positioned that the slider 22 thereof is near the bottom of the container when the opening 16 is closed. This container is provided with a top 23 which carries a hook 24, whereby the device may be suitably suspended.

In the form of device shown in Fig. 2, the container 30 is similar in form to that shown in Fig. 1. It is provided in its side wall 31 with a container opening 32 which is closed by a hookless fastener 18. This opening extends the greater part of, or the entire length of the container, and provides accessibility to the interior thereof. The hookless fastener in this form, however, is preferably so placed that the slider 22 thereof is at the top of the container when the opening 32 thereof is substantially closed. In this form of device, the top 33 of the container is preferably supported by a wire frame 34 which extends around all four sides of the device. This wire frame supports a cross member 35, preferably of wood, to which the hook 24 is attached. The cross member supports a foldable garment hanger support 36. In the bottom of the container is preferably placed a rigid bottom piece 37 which may be of a size equal to the wire support 34, whereby the sides of the container at the bottom will be held in their extended positions. This container is provided with only one opening, as shown, the other opening being formed by the air conduit in the form of the attachment hose 40 which is extended through the side wall 31 by being passed through the upper end of the opening 32. The portion of the hose on the interior of the container extends downwardly along the inside of the wall 31, and over across the bottom piece 37, upon which it rests. The end of the hose on the outside of the container is connected to either the suction or pressure side of a household vacuum cleaner 41, which, for convenience of illustration, is shown in Fig. 2 as attached to the suction side. In order to keep the hose 40 at the top of the opening 32, as shown, a strap 42 may be provided which is secured to the top 33 and is looped around the portion of the hose which passes through the opening 32. It will be seen that in this form of device, the air is conducted to or drawn from the bottom of the container, depending upon whether pressure or suction is used in the treatment of the articles.

In the device shown in Fig. 3, the container 45 is provided in its side 46 with an opening 47 which is closed by means of a hookless fastener 18. The fastener is attached to the container in a position similar to that of Fig. 1, so that the opening will be closed when the slider 22 is near the bottom. This device is designed to be used in connection with an insecticide, and, therefore, an insecticide holder, 48 is provided. This holder is carried by the attachment sleeve 49 which is arranged adjacent the upper end of the opening 47. This form of device has its top 50 supported by a wire frame 34 to which is attached a cross member 35. This cross member carries a garment hanger support 36, and a supporting hook 24 is also attached to this member.

The device shown in Figs. 4 and 5 comprises a container 55, in the side wall 56 of which is formed an opening 57, similar to the form of device shown in Fig. 2. This opening is closed by means of a hookless fastener 18, having its slider 22 near the top of the container when the opening is closed. An attachment sleeve 58 is secured to the side 56, adjacent the upper end of the opening 57. A rigid tube 59 is attached to or made an integral part of the sleeve 58 and extends across the upper interior of the container. It is preferably supported by lugs 60 which are attached to a top piece 61 made of thin wood or heavy card or press board. The supporting hook 24 of this container is preferably carried by a screweye 62 which extends through the top 63 of the container and the top piece 61, and enters the tube 59, whereby the tube as well as the container is supported by means of the hook 24. The tube is provided with a plurality of downwardly extending hooks 64, by which garments may be supported. Secured to the inner end of the tube 59 is a hose 65, which passes down to the bottom of the container, where its lower end 66 is supported by means of a rigid bottom piece 67, which is preferably provided. The air being forced into or drawn from this container, is thereby conducted to or taken from the bottom of the container, as in the form of Fig. 2.

Where it is desired to use an insecticide in the form of device shown in Figs. 4 and 5, the modification shown in Fig. 6 may be employed. In this modification the inner tube 70 which may be made a part of the attachment sleeve 71, is provided in its inner end with a gauze or screen 72, whereby an insecticide may be placed within the tube when the articles are to be treated with the vapors thereof, the screen 72 preventing the insecticide from falling into the hose 73 and being forced out of the lower end thereof. The supporting hook 24 of this form is carried by a screweye 62 which is attached to the inner tube 70, as in the form of Figs. 4 and 5. A top piece 74 is provided in this form to which the tube 70 is secured and which is arranged inside the top 75 of the container 76.

The device shown in Fig. 7 is provided with an inner tube 80 in its upper end which is supported by a top piece 81 carried inside of the top 82 of the container 83. A hook 24 is carried by a screweye 84 which passes through the top 82, top piece 81, and into the tube 80. The tube 80 is carried by or made a part of the attachment sleeve 85. This attachment sleeve is secured to the side 86 of the container, and immediately below the sleeve is formed a container opening 87, which extends, like in the other forms, substantially the full length of the container. A hookless fastener 18 with its slider 22 is provided for closing the opening. The fastener is so positioned that the slider is at the bottom when the opening 87 is closed. This form of device is also used where it is desired to use an insecticide with the device. The inner end 88 of the tube is therefore closed so that the insecticide may be placed within the tube. The tube is provided with a plurality of perforations 89 in its lower and side faces, through which the vapor or the combination of vapors and air may pass.

The form of device shown in Fig. 8 is also designed for the use of an insecticide. This device is provided with a container 90 which has a top 91, underneath which is supported a rigid top plate 92. An insecticide holder 93 is carried by the top plate 92, and extends over substantially the entire bottom surface of the top plate, whereby a chamber 94 is provided. This insecticide holder may be in the form of screen as shown, or if desired it may be in the form of a perforated plate at one side of the chamber 94, and preferably passing through the side wall 95 of the container is an attachment sleeve 96. Arranged also in the wall 95 and having its upper end adjacent the attachment sleeve 96 is an opening 97 provided with a hookless fastener 18 having a slider 22. The fastener in this form is so positioned that the slider is at the bottom of the container when the opening is closed. In this form of device, I may provide a central cross member 98 which is disposed underneath the insecticide holder 93 and is secured to it by any suitable means. A supporting hook 24 is provided on this form of device, like on the other forms, and this is attached to a screweye 99. The screweye passes through the top 91 of the container, the top plate 92, and is secured to the cross piece 98. A rigid collar 100 or other suitable means is preferably carried by the screweye, so that the insecticide holder 93 will not be collapsed when the device is supported by the hook 24.

The device shown in Fig. 9 is designed primarily for articles which may be folded and which do not require to be supported by a garment hanger. The device shown in this figure comprises a container 105 which may be cylindrical in form, having its forward end 106 provided with a container opening 107. Around the opening is formed a hem 108, through which a drawstring 109 is passed, whereby the opening 107 may be wholly or partially closed. In this form, a piece of gauze or semi-porous material 110 is arranged about the opening 107, whereby the opening 107 may be completely closed, and air will be permitted to enter or pass out of the container through the gauze or semi-porous material. An attachment sleeve 111 is carried by the container and is preferably arranged adjacent the opening 107. A hose 112 is disposed within the body and is attached to the inner end of the attachment sleeve. This hose extends preferably the length of the container, and has its inner end 113 extended along the head 114 to substantially the center thereof, for the purpose of conducting air to or drawing air from the end of the container at the head 114.

In Fig. 10 the device there shown comprises a container 115 having a container opening 116 in its end head 117. The opening preferably extends clear across the end, and is provided with a hookless fastener 18, having a slider 22. In the side wall 118 of the container is arranged an attachment sleeve 119. This sleeve is, therefore, adjacent the opening 116, and attached to the sleeve is an insecticide holder 120. This holder, as shown, is made of gauze or screen, but obviously may be a perforated shell as shown in Fig. 3.

While I have shown only the attachment sleeve in many of the forms of my invention, it is obvious that the attachment hose of the vacuum cleaner or any other suitable hose may be connected to this sleeve when using my invention. It will be seen that when substantially non-porous material is used, such as rubberized fabric, the walls of the container will be drawn toward the articles being treated when suction is applied, and, conversely, the walls will be distended when pressure is applied. Obviously, the degree of the drawing or distending of the walls will depend not only upon the amount of suction or pressure applied, but also upon the relative air-tightness of the container and the size of the container opening.

Furthermore, while air has been referred to in the sense of air at room temperatures, it is clear that in some instances it may be desirable to use air which is heated.

While I have shown and described the hose on the inside of the container in the various forms as extending to the bottom of the container, this is only the preferred position of the hose and good results may also be attained by having the end of such hose within the container at some other position than at the bottom thereof.

Although I have described the container as collapsible, it is to be understood that this term includes a flexible as well as a collapsible container.

Obviously, these and other modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A device for treating articles comprising a container formed with a container opening through which articles to be treated may be inserted, an attachment sleeve carried by the container and disposed adjacent the container opening, and a tube carried within the container and in communication with the attachment sleeve.

2. A device for treating articles comprising a container formed with a container opening through which articles to be treated may be inserted, an attachment sleeve carried by the container and disposed adjacent the container opening, a tube carried within the container and in communication with the attachment sleeve, and a hose within the container having its upper end connected to the tube.

3. A device for treating articles comprising a container formed with a container opening through which articles to be treated may be inserted, an attachment sleeve carried by the container and disposed adjacent the container opening, a tube carried within the container and in communication with the attachment sleeve, and means for closing the container opening.

4. The combination with a suitable source of air pressure, of a container formed with a container opening through which articles to be treated may be inserted, an attachment sleeve secured to the container and disposed adjacent the container opening, a hose for connecting the sleeve with the source of pressure, and a tube carried within the container and in communication with the attachment sleeve.

5. The combination with a vacuum cleaner of a portable, collapsible device for treating articles comprising a container formed with a container opening through which articles to be treated may be inserted, an air conduit carried by and leading into the container and disposed adjacent the container opening, and means for closing the container opening.

6. The combination with a vacuum cleaner of a portable, collapsible device for treating articles comprising a container formed with a container opening through which articles to be treated may be inserted, an attachment sleeve carried by the container and disposed adjacent the container opening, and means for closing the container opening.

In testimony whereof, I have hereunto signed my name.

ABRAHAM N. SPANEL.